(12) United States Patent
Liao et al.

(10) Patent No.: US 6,570,428 B1
(45) Date of Patent: May 27, 2003

(54) ADJUSTABLE CLOCK SKEW APPARATUS AND METHOD FOR GENERATING CLOCK SIGNALS

(75) Inventors: Wen-Bin Liao, Hsinchu (TW); Wen-Chi Fang, Hsinchu (TW)

(73) Assignee: Winbond Electronics Corporation, Hsinchu (TW)

(*) Notice: Subject to any disclaimer, the term of this patent is extended or adjusted under 35 U.S.C. 154(b) by 0 days.

(21) Appl. No.: 09/617,469

(22) Filed: Jul. 17, 2000

(30) Foreign Application Priority Data

Mar. 24, 2000 (TW) ...................... 089105475 A

(51) Int. Cl.[7] .............................................. H03D 3/24
(52) U.S. Cl. ...................... 327/291; 327/327; 327/158; 327/292; 327/270
(58) Field of Search ........................ 327/271, 20, 33, 327/292, 291, 270, 158

(56) References Cited

U.S. PATENT DOCUMENTS

| | | | | |
|---|---|---|---|---|
| 5,369,640 A | * | 11/1994 | Watson et al. | 327/292 |
| 5,526,286 A | * | 6/1996 | Sauerwein et al. | 364/550 |
| 5,812,626 A | * | 9/1998 | Kusumoto et al. | 327/271 |
| 5,878,055 A | * | 3/1999 | Allen | 371/27.7 |
| 6,075,832 A | * | 6/2000 | Geannopoulos et al. | 327/152 |

* cited by examiner

*Primary Examiner*—Dinh T. Lee
(74) *Attorney, Agent, or Firm*—Ladas & Parry

(57) ABSTRACT

The present invention relates to an adjustable clock skew apparatus and method for generating clock signals, which resolves the drawbacks of costing a user much time and effort to adjust clock skews of all components on a motherboard. In order to accomplish the object, the present invention proposes three operating modes: hardware setup, software setup or a mixture of hardward and software setup. A user just needs to adjust a plurality of exterior switches or to adjust a Basic Input Output System (BIOS) of the motherboard to modify the parameter of clock skew, and clock signals with necessary clock skews will be obtained.

7 Claims, 2 Drawing Sheets

ADJUSTABLE CLOCK SKEW APPARATUS AND METHOD FOR GENERATING CLOCK SIGNALS

BACKGROUND OF THE INVENTION

1. Field of the Invention

The present invention relates to an apparatus and method for providing clock signals in a component layout on a board. More particularly, the present invention is directed to providing clock signals having respective adjustable clock skews to respective board components.

2. Description of Related Art

Presently, the most popular design for digital circuits is a synchronous design wherein all components on a board respond to the same clock signal, for synchronizing their operations. The most popular way of providing such synchronization is to provide a single clock generator for all clock signals used by all the components of the layout on a motherboard. However, because the distances are not the same between the clock generator and all the other components in the layout, each component will receive a clock signal that has a slightly different time shift. This slight difference is called a "skew."

The skew of clock signals provided by a conventional clock generator has a fixed value. Circuit designers conventionally add exterior resistors and capacitors to the output pins of the clock generator chip to adjust the fixed clock skew provided by each of the output pins on the clock generator. The resistances and capacitances provided for pins connected to exterior components that are at a greater distance from the clock generator than other components should be less than that provided for the others. Thus, The resistance and capacitance provided for exterior components that are at a shorter distance from the clock generator must be increased to synchronize those components with each other. In particular, the CPU and any chipset, PCI bus and DRAM module are important components on the motherboard that must be synchronous to ensure accurate data transmission.

These conventional design procedures cost circuit designers much time and effort, they cannot be used in some motherboard and memory module layouts. Moreover, each time a clock generator chip is changed or the layout of a board modified, they are an expensive waste of human effort. This conventional way in which clock generator chips are installed in the layout of a board needs to be changed to meet consumer needs.

SUMMARY OF THE INVENTION

The present invention eliminates the cost of the time and effort required to adjust clock skew of all components on a motherboard in the prior art. In order to accomplish this, the present invention provide an apparatus and method for generating clock signals that has three operating modes: hardware setup, software setup or a combined hardware and software setup. A user adjusts a plurality of exterior switches of the apparatus according to the present invention or a Basic Input Output System (BIOS) of the motherboard to modify the clock skew parameter, thereby providing output clock signals having clock skews fitted to all components on the motherboard.

In one embodiment apparatus to setup the clock skew in accordance with the present invention comprises a hardware clock skew register, a voltage controlled oscillator and a delay module. The hardware clock skew register is used to store a combination provided by the plurality of switches. The voltage controlled oscillator is used to generate a basic clock. The delay module is connected to said hardware clock skew register and said voltage controlled oscillator and is used to generate the output clock signals according to the combination provided by said hardware clock skew register.

When the clock skew is set up using both hardware and software, the present invention comprises a hardware clock skew register, a software clock skew register, a clock skew control register, a first multiplexer, a voltage controlled oscillator, and a delay module. In one particular embodiment the clock skew is set up by software, said hardware clock skew register stores a constant value. In another particular embodiment where the clock skew is set up using both hardware and software, said hardware clock skew register is used to store a combination value determined by setting a plurality of exterior switches. The software clock skew register is used to store a value provided by said BIOS. The clock skew control register is used to store control instructions provided by said BIOS. The first multiplexer selects one of the values, either the value of the hardware clock skew register or the software clock skew register. The voltage controlled oscillator is used to generate a basic clock. The delay module is connected to said first multiplexer and said voltage controlled oscillator and has an output that provides a clock signal having a skew that corresponds to the value selected by said first multiplexer.

A further embodiment, where the clock skew is set up by software, is similar to the embodiment using both hardware and software setup. The difference is that the hardware clock skew register is not connected to the exterior switches in this software setup only embodiment. The hardware clock skew register itself provides a default value.

A method in accordance with the present invention comprises the following steps: system start up using a hardware and determining whether clock skew, to change from the default clock skews to another skew. If another skew is required by a BIOS of said system, a clock skew corresponding to a value provided by said BIOS is provided.

BRIEF DESCRIPTION OF THE DRAWINGS

The present invention will be described with reference to the appended drawings in which.

DETAILED DESCRIPTION OF PREFERRED EMBODIMENTS

The present invention has three operating modes: hardware setup, software setup and a mixture of hardware and software setup that eliminate the disadvantage of costing a user much effort and time to adjust clock skew of a clock generator applied in a motherboard nowadays. The three operating modes will be illustrated as follows.

Figure 1:
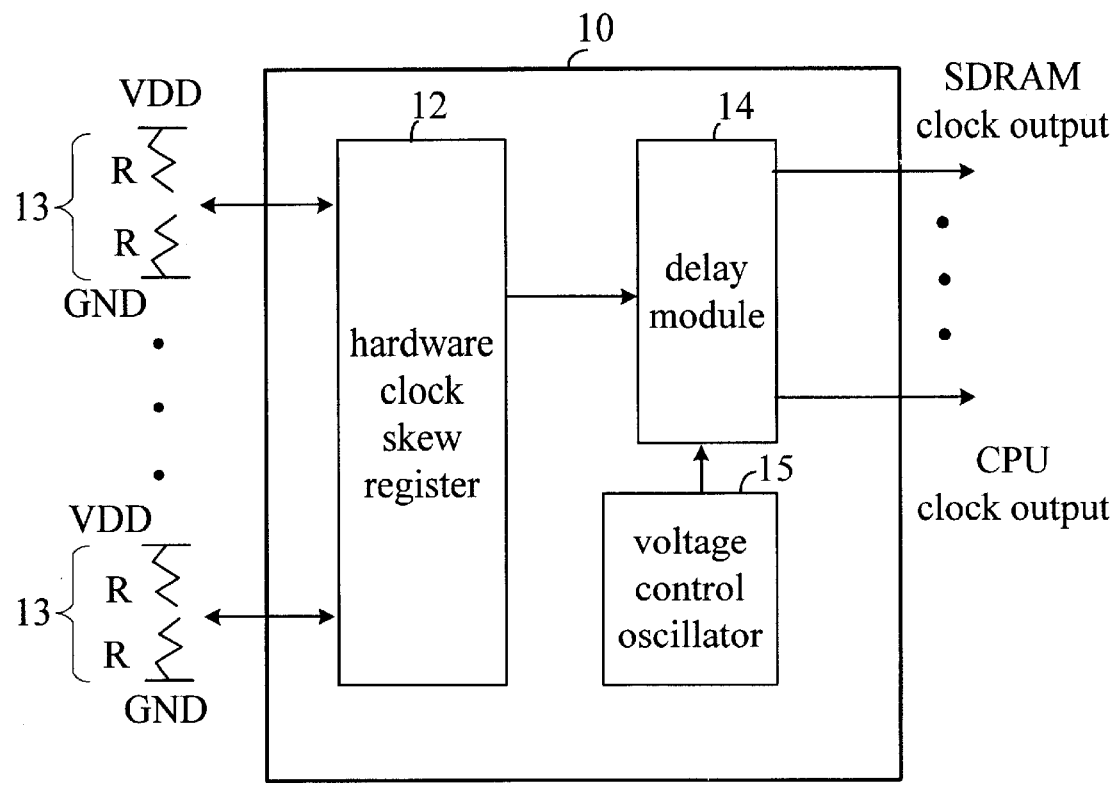
FIG 1 is a structural diagram of a hardware arrangement according to the present invention.

FIG. 1 is a structural diagram of a hardware arrangement according to the present invention. An apparatus 10 of the present invention comprises a hardware clock skew register 12, a delay module 14 and a voltage controlled oscillator 15. A plurality of exterior switches 13 is disposed outside the apparatus. Respective logic combinations provided by combinations of these switches 13 correspond to a clock signal with a specific clock skew in the apparatus 10. In other words, a user can obtain an output clock signal with a necessary clock skew by adjusting the logic combination provided by the switches 13. The hardware clock skew register 12 is connected to the switches 13, and used to store a predetermined value of the switches 13. The voltage controlled oscillator 15 is used to generate a basic clock. The delay module 14 is connected to the voltage controlled oscillator 15 and hardware clock skew register 12 to generate output clock signals having a clock skew different from the clock skew of clock signals corresponding to the basic clock. The clock signals have respective clock skews and are transmitted to important components on the motherboard, such as CPU, chipset, DRAM module and PCI interface, etc. The delay module 14 includes a well-known logic-gate chain and multiplexers, as illustrated in the embodiment shown in FIG. 4.

Figure 2:
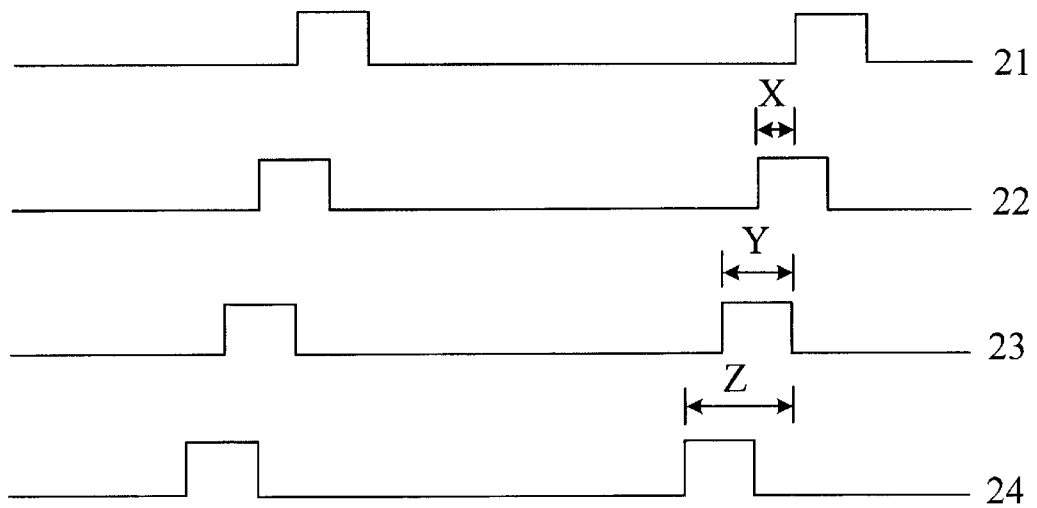
FIG. 2 is a schematic diagram of clock skews according to the present invention.

FIG. 2 is a schematic diagram of clock skews according to the present invention, wherein the time difference between the leading edges of two clocks is called "clock skew." For example, the clock skew between a first clock 21 and a second clock 22 is X, The clock skew between a first clock 21 and a third clock 23 is Y, and the clock skew between a first clock 21 and a fourth clock 24 is Z. If a reference is be selected on a motherboard, for example, the first clock 21 to be output to the CPU, then clock skews of other components can be set relative to the clock skew of that CPU clock according to the clock tree layout of all components on the motherboard. Referring to FIG. 1, first the exterior switches 13 are set, and then the necessary clock skew is provided by adjusting the delay module 14 using either the exterior switches or the system's BIOS program.

Figure 3:
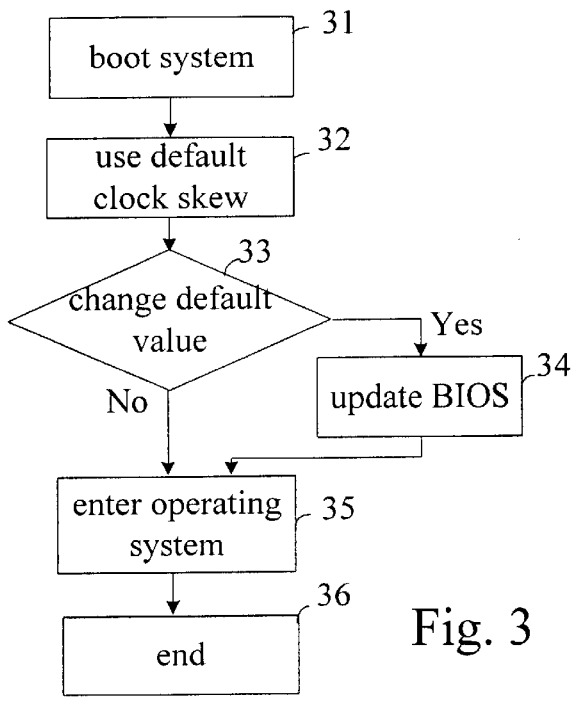
FIG. 3 is a flow chart of a software setup method according to another embodiment of the present invention.

FIG. 3 is a flow chart of a software set up method according to another embodiment of the present invention. In step 31, a system is started up, for by applying power to a personal computer for example, in step 32, the system uses a default clock skew, which is stored in a register (not shown) of the apparatus 10 or directly implemented by a combination of logic gates. Step 33 determines whether the default clock skew is used or the clock skew is updated. If the default clock skew is used, then the skew setup ends, as shown in step 35. The present invention can, alternatively, use a system's BIOS (not shown) to update clock skew parameters of the system. The BIOS stores parameters that are useful to the system that are read during the startup of the system. Modifying the BIOS program to add clock skew to those system parameters allows a user to modify clock skew as desired. The BIOS can be connected to a system register which stores the clock skew parameter through a bus interface 48, such as a well known I2C or SMBus so as to modify the content of the register in step 34. After the parameter of clock skew is modified, then the skew setup ends, as shown in step 35.

Figure 4:
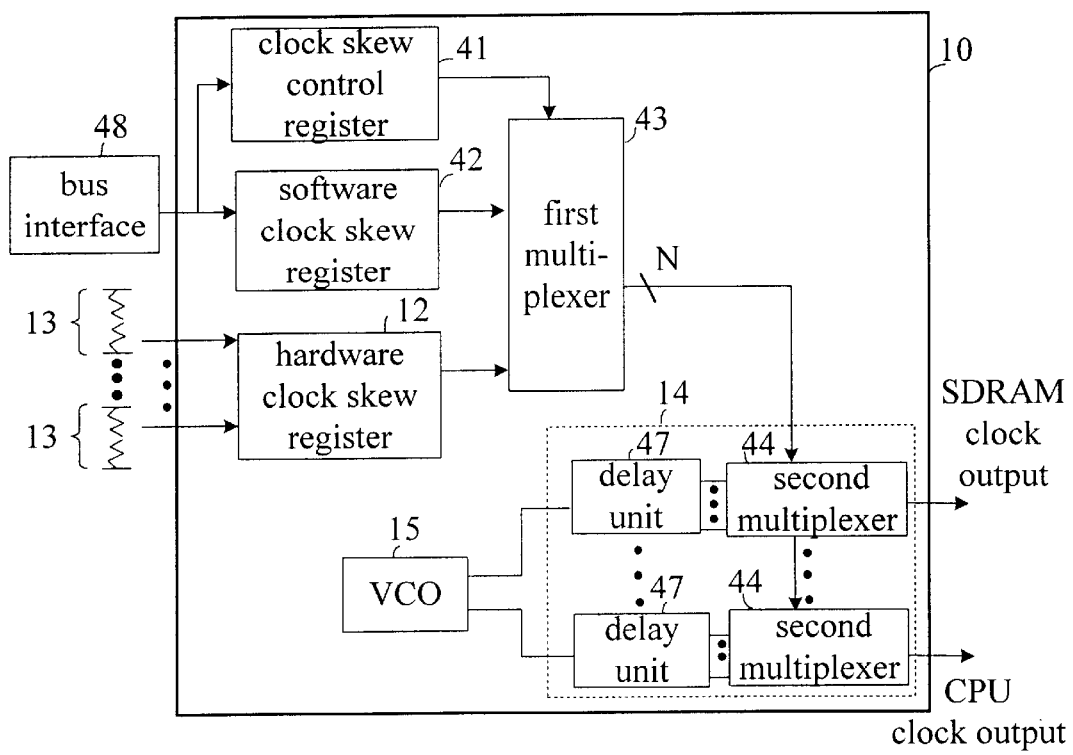
FIG. 4 is a structural diagram of a combined hardware and software arrangement according to a further embodiment of the present invention.

FIG 4 is a structural diagram of a combined hardware and software setup arrangement according to a further embodiment of the present invention. The arrangement combines the advantages of the hardware setup and software setup mentioned above. The apparatus 10 of the present invention comprises a clock skew control register 41, a software clock skew register 42, a hardware clock skew register 12, a first multiplexer 43, a second multiplexer 44, a voltage controlled oscillator 15 and a plurality of delay units 47. Outside the apparatus 10, a bus interface 48 and switches 13 are provided. The bus interface 48 is a well known I2C Bus or SMBus, and is connected to a BIOS to receive the parameter of clock skew modified by a user through a software interface (not shown). The function of the switches 13 is the same as that mentioned in the operating mode of hardware setup. The clock skew control register 41 is used to store control parameters transmitted by the bus interface 48 that control the first multiplexer 43. The software clock skew register 42 is used to store the clock skew parameter transmitted by the bus interface 48.

The first multiplexer 43 uses the content of the hardware clock skew register 12 during setup of the apparatus 10. The combinational logic provided by the switches 13 can change the content of the hardware clock skew register. Also, after the system is launched, the software interface provided by the BIOS can be used to update the content of the clock skew control register 41 and software clock skew register 42. The first multiplexer 43 then uses the content of the software clock skew register 42. A combination of the delay unit 47 and second multiplexer 44 in the delay module shown in FIG. 1 provide the clock skew. The delay unit 47 can be implemented by connecting logic-gates in series, as is well-known in the art. The output provided by the first multiplexer 43 is transmitted to the control input of the second multiplexer 44 for selecting an output clock signal from each delay unit 47 that has the clock skew needed by the SDRAM, the CPU, etc., respectively.

The flow chart for using both hardware and software is similar to FIG. 3. The only difference is that the default clock skew is provided by the combinational logic of the switches 13 instead of a fixed value inside the apparatus 10.

The structure of the embodiment providing a software setup as the only clock skew adjustment is similar to FIG. 4. The only difference is that the hardware clock skew register 12 is not connected to exterior switches 13. Instead, the hardware clock skew register 12 itself provides a constant default value.

The above-described embodiments of the present invention are provided for the purpose of illustration only. Numerous alternative embodiments may be devised by those skilled in the art without departing from the spirit and scope of the invention. The invention is defined by the claims provided below.

What is claimed is:

1. Apparatus in a given system layout for providing adjusted clock signals having respective adjustable clock skews relative to a basic clock signal to respective components in said given layout, said apparatus comprising:

means for storing respective adjustable clock skew values for respective components in the given layout;

input means for adjusting said respective adjustable clock skew values; and a delay module connected to said input means and connected so as to receive said basic clock signal for providing adjusted clock signals respectively having said adjusted clock skew values to outputs of said delay module adapted to be connected to said respective components, wherein said delay module includes a plurality of delay units connected to respective multiplexer units for providing said adjusted clock signals.

2. The apparatus of claim 1, wherein said delay units each comprise a respective series of logic gates.

3. Apparatus in a given system layout for providing an adjusted clock signal having a clock skew relative to a basic clock signal to a component in said given layout, said system having a BIOS, said apparatus comprising:

a hardware clock skew register in said given layout for storing a first clock skew value for a component in a given layout;

manual input means in said given layout for adjusting said hardware clock skew values;

a software clock skew register for storing a second clock skew value provided by a BIOS;

a clock skew control register for storing control instructions provided by said BIOS;

a multiplexer connected to said clock skew resistors and said control register for selecting one of said first and second clock skew values; and a delay module connected to said multiplexer and connected so as to receive said basic clock signal for providing an adjusted clock signal having said one clock skew value to an output of said delay module.

4. The apparatus of claim 3, wherein said delay module includes a plurality of delay units connected to respective second multiplexers, said delay units being connected to said voltage controlled oscillator for generating a plurality of clock signals having respective clock skews, said output of said delay module being connected to provide one of the plurality of clock signals having a respective adjusted clock skew corresponding to said clock skew value provided by said first multiplexer.

5. The apparatus of claim 4, wherein the delay units each comprise a respective series of logic gates.

6. The apparatus of claim 3, wherein said first multiplexer selects the combination provided by the hardware clock skew register when the apparatus starts up, and selects the setting provided by the software clock skew register when said BIOS sends a control instruction to said clock skew control register.

7. Apparatus in a given layout for supplying respective adjusted clock signals to respective components in said given layout, said adjusted clock signals having respective adjusted clock skews relative to a basic clock signal, said apparatus comprising:

input means for providing respective adjusted clock skew values for respective components in a given layout;

clock skew register means in the given layout for storing said respective clock skew values;

a voltage controlled oscillator in the given layout for generating a basic clock signal; and a delay module in the given layout connected to said clock skew register means and said voltage controlled oscillator for providing clock signals having respective clock skews corresponding to said clock skew values stored in said clock skew register means to respective outputs for said respective components, wherein said input means includes a plurality of exterior switches having a plurality of settings corresponding to said respective adjusted clock skew values.

* * * * *